United States Patent [19]

Gram

[11] Patent Number: 4,546,615
[45] Date of Patent: Oct. 15, 1985

[54] METHOD FOR PICKING-UP ICE LOLLIES FROM FREEZING POCKETS IN AN ICE LOLLY FREEZING MACHINE AND PICKING-UP DEVICE FOR CARRYING OUT THE METHOD

[75] Inventor: Klaus Gram, Vojens, Denmark

[73] Assignee: Brodrene Gram A/S, Vojens, Denmark

[21] Appl. No.: 560,235

[22] Filed: Dec. 12, 1983

[30] Foreign Application Priority Data

Dec. 17, 1982 [DK] Denmark ............................ 5604/82

[51] Int. Cl.$^4$ ............................................. A23G 9/00
[52] U.S. Cl. ......................................... 62/73; 62/345;
425/126 S; 426/389; 426/421
[58] Field of Search ................... 62/345, 73; 426/389,
426/421, 515; 425/126 S, 116; 53/594

[56] References Cited

U.S. PATENT DOCUMENTS

| 2,791,890 | 5/1957 | Hoyer | 62/345 |
| 2,884,875 | 5/1959 | Rasmusson | 62/345 X |
| 3,261,178 | 7/1966 | Okada | 62/345 |
| 3,488,976 | 1/1970 | Hirahara et al. | 62/73 X |
| 3,695,895 | 10/1972 | Brown | 426/389 |

Primary Examiner—William E. Tapolcai
Attorney, Agent, or Firm—Watson, Cole, Grindle & Watson

[57] ABSTRACT

Ice lollies are frozen in two-parted moulds which are inserted in rows of freezing pockets in an ice lolly freezing machine. The moulds are thawed loose from the freezing pockets in which freezing has been carried out, are lifted out of the freezing pockets, separated for releasing the frozen ice lollies, assembled and inserted again into a row of freezing pockets. Before the moulds are lifted, a moderate heating of the freezing pockets is carried out sufficient for thawing loose the moulds with respect to the pockets. Then the moulds are lifted and moved to a position outside the area of such freezing pockets of such freezing machine. At the position the moulds are heated for thawing loose the ice lollies. Then the moulds are separated and the ice lollies removed while the moulds are positioned outside the area of the freezing pockets. Now the moulds are moved back to the area of the freezing pockets and are inserted into an empty row of freezing pockets. A corresponding picking-up device moves the lifted moulds in close condition to a position outside the area of the freezing pockets and at such position a thawing up medium is supplied to the outer surfaces of the moulds. The moulds are then moved back to the area of the freezing pockets.

5 Claims, 9 Drawing Figures

METHOD FOR PICKING-UP ICE LOLLIES FROM FREEZING POCKETS IN AN ICE LOLLY FREEZING MACHINE AND PICKING-UP DEVICE FOR CARRYING OUT THE METHOD

BACKGROUND OF THE INVENTION

The present invention relates to a method for picking-up ice lollies from rows of freezing pockets in an ice lolly freezing machine in which the ice lollies are frozen in two-parted moulds by which method the moulds are thawed loose from a row of freezing pockets, in which freezing has taken place, are lifted up from the freezing pockets and are separated for release of the frozen ice lollies, assembled and inserted in a row of freezing pockets.

In accordance with a generally aforedescribed type, set forth in U.S. Pat. No. 4,396,367, dated Aug. 2, 1983. According to said publication the moulds are thawed loose in each row of freezing pockets before the lifting of the moulds, to such a degree that the moulds are thawed loose from the corresponding freezing pockets, and the ice lollies are thawed loose from the moulds, after which the moulds are lifted out of the freezing pockets row by row, are separated for removal of the ice lollies, are closed and are again inserted in the corresponding row of freezing pockets while these stand still. In other words, the thawing, the lifting, the separation, the closing and the insertion are effected during a single working step of the corresponding freezing machine.

Such method, however, necessitates a strong heating of the freezing pockets, because sufficient heat must be supplied for thawing the moulds loose from the freezing pockets and thawing the ice lollies loose from the moulds while the moulds are positioned in the freezing pockets. Accordingly, a thawing medium temperature of about 25°–30° C. is employed. Moreover, experiences indiciate that it may be difficult to avoid material remnants remaining on or in the moulds which prevents closing the molds completely thus resulting in problems of inserting the mould rows in the rows of freezing pockets.

SUMMARY OF THE INVENTION

A method according to the present invention is such that moderate heating of the rows of freezing pockets is used before lifting the moulds, i.e. enough for thawing the moulds loose from the freezing pockets, the moulds being lifted, being moved to a position outside the area of the freezing pockets of the freezing machine, the moulds being heated after having been moved outside such area, the molds being separated and the ice lollies being removed from the moulds while the moulds are outside such area, and the moulds being moved back to such area, and whereafter the moulds are inserted in an empty row of freezing pockets. With such method the strong heating of the freezing pockets previously required before the lifting of the moulds is avoided and accordingly the cold economy of the freezer is improved since the temperature of the thawing medium can be reduced to approximately 6°–8° C. under otherwise uniform conditions. Besides, the risk of jamming because of material remnants on or in the moulds is avoided. Furthermore, drops from the moulds or the ice lollies which may fall into the freezing pockets and result in jamming are avoided.

Furthermore, the moulds according to the present invention may be subjected to a washing operation while they are positioned removed from the freezing pocket area.

A further embodiment of the method according to the invention wherein a rotary ice lolly freezing machine is used, wherein the freezing pockets are positioned in radial rows and a rotary lifting apparatus is used having radially directed upwardly and downwardly movable arms, is according to the invention such that the mould with the ice lollies arranged therein are moved corresponding to a ¼ revolution of the lifting apparatus, the separation of the moulds and the removal of the ice lollies being carried out in this position, whereafter the moulds are moved radially relative to the axis of the lifting apparatus, the moulds being swung a ¼ revolution and being moved back to the position at which they were lifted. Accordingly, operation of the freezing machine with empty pockets is avoided.

The invention also relates to an appropriate picking-up device to be used in carrying out the method for picking-up ice lollies from an ice lolly freezing machine having freezing pockets arranged in rows, and two-parted moulds insertable in such rows, means for supplying thawing medium to the outer surfaces of the freezing pockets, means for lifting the moulds from the freezing pockets, means for separating the moulds, means for removing the frozen ice lollies and means for inserting the moulds into the freezing pockets. According to the invention the picking-up device comprises means for moving the lifted moulds in closed condition to a position outside the area of the freezing pockets, and that outside such area means are arranged for supplying thawing medium to the outer surfaces of the moulds, such picking-up apparatus comprising means for moving the moulds back to such area and inserting the closed moulds into a row of freezing pockets.

In the special case where the freezing pockets are positioned in radial rows in a rotary freezing table, and the means for lifting the moulds up from the freezing pockets are constituted by a rotary lifting apparatus having radially directed upwardly and downwardly movable arms, the picking-up apparatus according to the invention is such that the lifting apparatus has a working position for supplying thawing medium to the outer surface of the moulds, the working position being offset approximately 90° in the direction of rotation of the lifting apparatus from the lifting position of the lifting apparatus.

DESCRIPTION OF THE PREFERRED EMBODIMENT

In the drawings, 1 is an ice lolly freezing machine with a rotary freezing table 2, wherein radially extending rows of freezing pockets are provided. One such row is indicated by a broken line 22a. Accordingly, the freezing table constitutes an area with freezing pockets. Along the circumference of the freezing table 2 a filling apparatus 3 is arranged for filling the freezing pockets with the material to be frozen. Such filling is carried out row by row and the filling is carried out while a row of freezing pockets is positioned below the filling apparatus 3. When a row of freezing pockets have been filled the freezing table is moved one step in the clockwise direction of FIG. 1. In such direction of rotation, a stick inserter 4 and a cleaning device 5 follow after the filling apparatus 3. The plant, moreover, comprises a picking-up apparatus comprising a lifting apparatus 8 with a column 41, FIG. 3, which is arranged outside the circumference of the table 2, and which supports radially extending lifting arms 9. Also the lifting apparatus 8 is rotatable clockwise and is moved corresponding to the angle between two adjacent lifting arms during each step.

Figure 1:
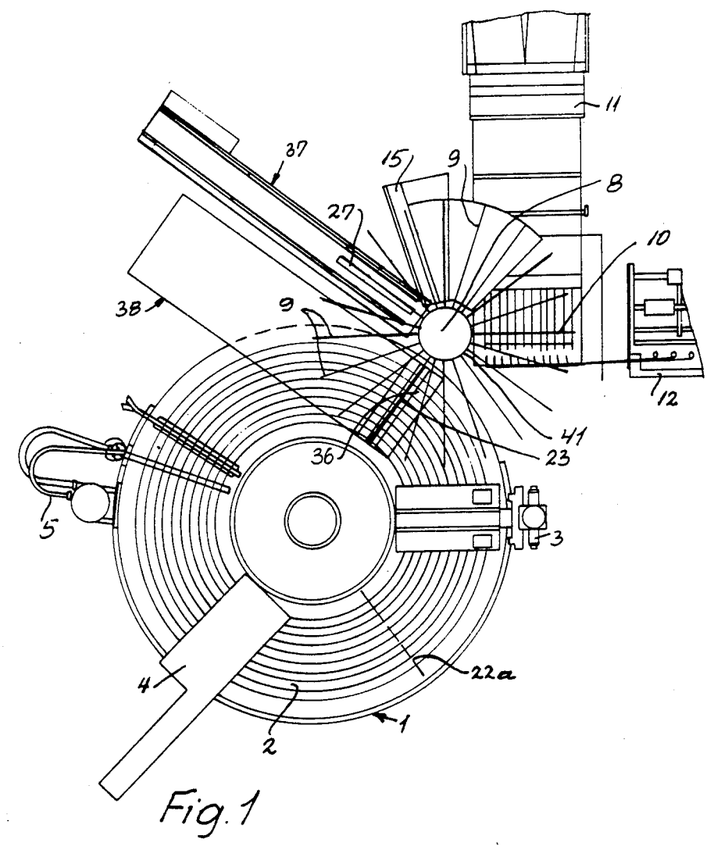
FIG. 1 schematically shows a plan view of a plant comprising a rotary ice lolly freezing machine and an embodiment of the picking-up device according to the invention.

A freezing apparatus as shown in FIG. 1, normally, works in a manner that, as mentioned, the freezing pockets are filled by means of the filling apparatus 3. When the material supplied to the freezing pockets is semistiff, sticks are inserted by means of the stick inserter 4 and sometime before the freezing pockets reach the lifting apparatus 8, a thawing medium is sprayed onto the outside of the freezing pockets by means of an apparatus 36, whereafter the ice lollies can be lifted by means of the lifting apparatus 8 when the row of freezing pockets concerned occupies a radial position with respect to the lifting apparatus 8. Now, the lifting apparatus 8 lowers one of the arms 9 which is provided with tongs 25, and the row of ice lollies concerned is gripped and lifted. Then the lifting apparatus is rotated clockwise, and when the lifting arm 9 concerned has reached a position designated 10 in FIG. 1, the ice lollies carried by the arm in question are deposited in a packing apparatus 11 having a number of packing paths corresponding to the number of freezing pockets in each row. Packing material is fed to the packing apparatus 11 by means of a feeding apparatus 12.

If it is desired to provide the ice lollies with a coating, the ice lollies are dipped by means of the corresponding lifting arm into a container 15 containing coating material.

Figure 2:
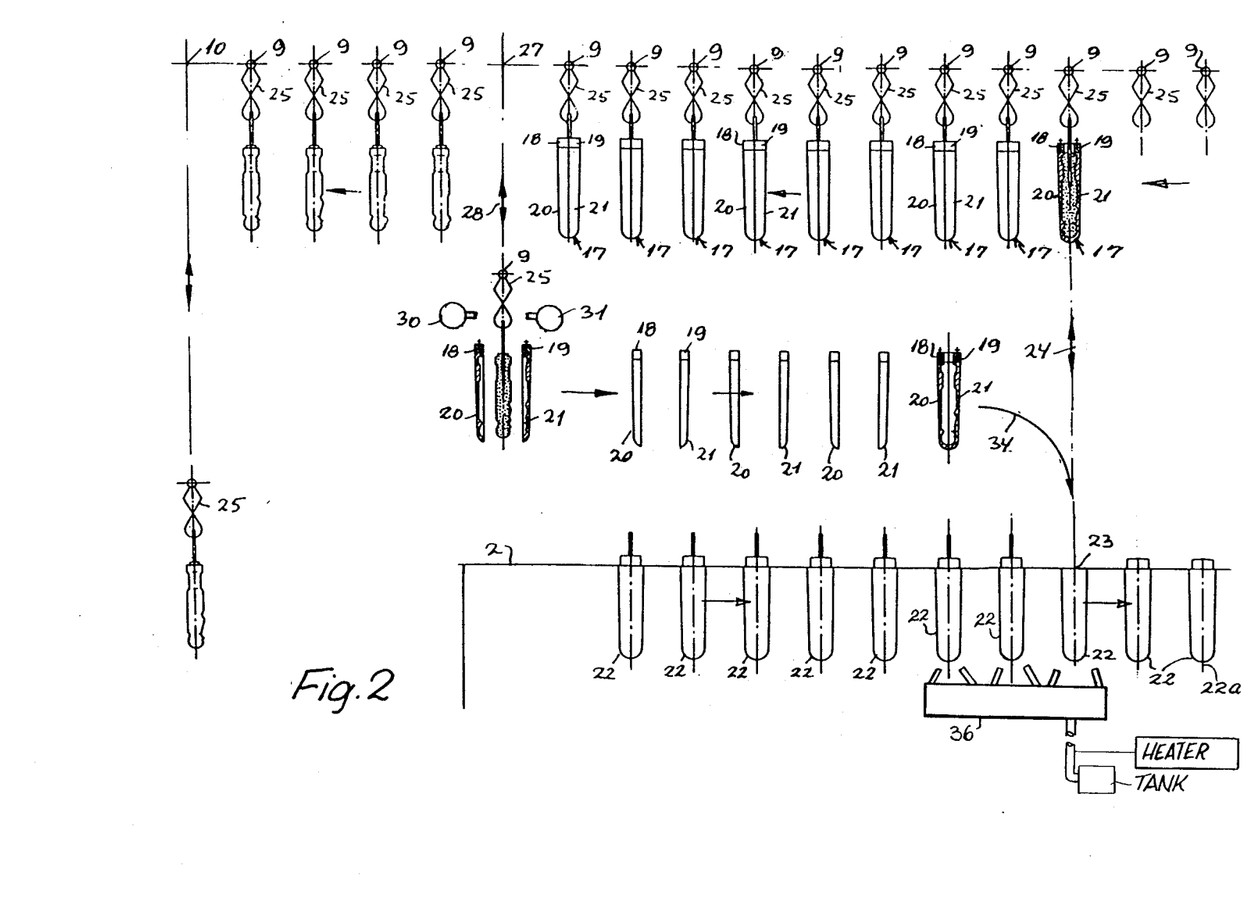
FIG. 2 shows a diagram for illustrating the manner of operating the plant shown in FIG. 1.
Figure 3:
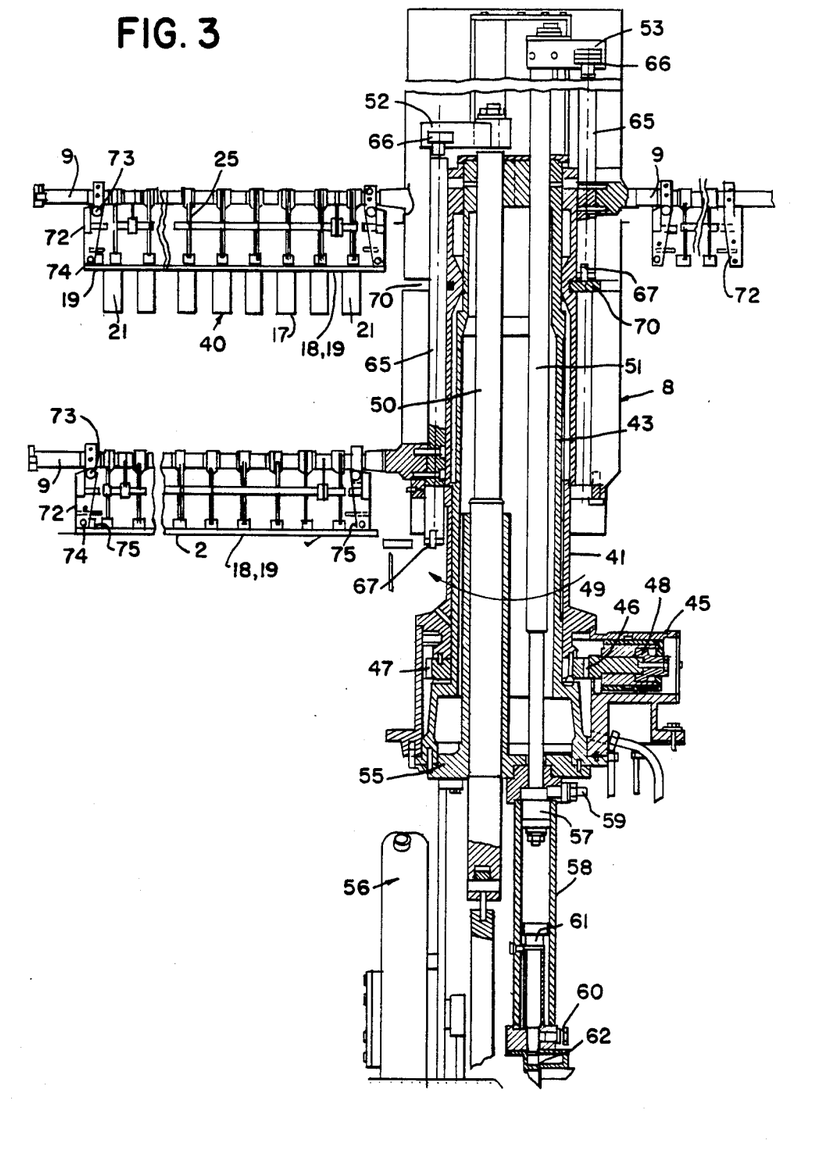
FIG. 3 is a vertical section of a rotatable lifting apparatus of the plant shown in FIG. 1.

When the freezing machine operates in the normal manner as described above, it is rather limited as to how many different shapes the ice lollies may be given, since the freezing pockets must actually have a slip in the upward direction. Therefore two-parted moulds 17 (FIG. 2) are provided for the freezing machine. The mould halves 20 and 21 of the moulds 17 are held together row by row by support rods 18 and 19, respectively, in such a manner that each row of moulds comprises a number of moulds corresponding to the number of freezing pockets in a radial row in the freezing table 2. One set of mould halves 20 for a row is carried by one support rod 18 and such other set of mould halves 21 for the row is carried by the other support rod 19. In the closed condition of the moulds, the moulds have an outer shape which corresponds to the freezing pockets which in FIG. 2 are shown schematically at 22. In FIG. 3, one such row 40 of moulds 17 is shown suspended in a lifting arm 9 of the lifting apparatus 8 Moreover, the plant illustrated in FIG. 1 includes an apparatus 37 for removing the moulds from the ice lollies pickedup and for moving the moulds radially away from the lifting apparatus 8. After the removal of the moulds from the ice lollies in a manner to be described in more detail hereinafter, the moulds are transferred, while being suspended in their support rods 18 and 19, to an apparatus 38 for transporting the moulds and insertion of the moulds into the freezing machine 1. Also the latter apparatus 38 will be further explained in the following.

In order to facilitate the following description, the manner of operating the plant illustrated in FIG. 1 will be described with reference thereto and to the FIG. 2 which is to be understood as a development.

When a row of freezing pockets has reached the position designated 23 in FIG. 2, the lifting arm 9, cf. FIG. 2, which is positioned above the row of freezing pockets concerned, is lowered, and the sticks of the ice lollies positioned in this row are gripped by means of tongs 25 suspended in the arm 9 concerned, and simultaneously also the support rods 18 and 19 of the row of moulds concerned are gripped, whereafter both the moulds and the corresponding ice lollies are lifted out from the corresponding freezing pockets 22 as indicated by the double arrow 24 in FIG. 2. When the lifting arm 9 concerned, by stepwise rotation of the lifting apparatus, arrives at the position designated 27 in FIG. 2, which is offset 90° from the position 23, the lifting arm concerned is lowered as indicated in FIG. 2, cf. the double arrow 28, and thawing medium is sprayed against the outer surfaces of the moulds by means of nozzle arrangements 30, 31. Now, the support rods 18 and 19 of the row of moulds concerned, are gripped by separating means, which also will be described in more detail hereinafter, and thereby the two rows of mould halves 20 and 21 will be moved away from each other in such a manner that the ice lollies are released. The two rows of mould halves are now moved away from the position 27 by the apparatus 37, and the lifting arm 9 concerned is lifted back to the position 27 and continues, during the movement of the lifting apparatus, to the position 10, at which the ice lollies suspended by means of the tongs 25 are deposited in the packing apparatus 11 a way known per se. After having been transported to the end of the apparatus 37, the rows of mould halves 20 and 21 are gripped and positioned manually at the end of the apparatus 38 for transportation of the moulds back to the ice lolly freezing machine, and for insertion of the moulds into a row of freezing pockets. This part of the movement is indicated at the intermediate level in FIG. 2. When the rows of mould halves arrive at the end of the apparatus 38, the rows of mould halves are closed two by two as shown in FIG. 2, and a closed row of moulds is now, as indicated by means of the arrow 34, inserted in the row of freezing pockets 22, from which a row of moulds has just been lifted. As it appears from FIG. 2, the returning of the moulds by means of the apparatus 38 is carried out at a level which is lower than the level to which the filled moulds are the lifting arms 9 in order to avoid obstruction of the movement of the moulds suspended in the arms 9.

The lifting apparatus 8 comprises a hollow column 41 rotatable about an interior, generally cylindrical stationary hollow housing 43. The column 41 is rotatable about the hollow housing 43 by a rotating device 45 comprising a toothed rack 46 which is reciprocatable, perpendicular to the drawing plane in FIG. 3, by a cylinder device 49. The toothed rack 46 cooperates with a toothed rim 47 secured to the exterior of the column 41. The toothed rack 46 may be engaged with a disengaged from the toothed rim 47 by means of a piston device 48. The column 41 is rotated stepwise in the direction of the arrow of FIG. 3 by pushing the toothed rack 46 upwardly from the drawing plane in FIG. 3, by means of the piston device 49, while the piston device 48 holds the toothed rack 46 engaged with the toothed rim 47. During the return movement of the toothed rack 46, the latter is disengaged from the toothed rim 47 by means of the piston device 48. During each such step to arms 9 are moved corresponding to the angle formed by two adjacent arms 9, cf. FIG. 1.

Inside the housing 43 two vertically reciprocable rods 50 and 51 are arranged, the upper ends of which extend upwardly through an end cover at the top end of the housing 43. To the outwardly extending end of the other rod 50, two catchers are secured, of which however only one, 52, is shown. Also the outwardly extending end of the rod 51 carries two catchers of which also only one, 53, is shown. Each catcher has a downwardly open T-shaped groove. The catcher 52 shown in FIG. 3 occupies the same radial direction as the lifting arm position 23 shown in FIG. 1, and the other not shown catcher secured to the rod 50 occupies the same radial direction as the lifting arm position 10 shown in FIG. 1. In FIG. 3 the catcher 53 of the rod 51 is shown positioned in the drawing plane for the sake of clarity, but acutally the catcher 53 occupies the same radial direction as the position 27 in FIG. 1. The other catcher of the rod 51 occupies the same radial direction as a lifting arm positioned above the container 15.

The lower end of the rod 50 extends outwardly through a bottom cover 55 at the bottom end of the housing 43 and is connected to a crank device generally designated 56.

To the left in FIG. 3, a lifting arm 9 is shown in two elevational positions of which the lowermost corresponds to the position of the rod 50 shown in FIG. 3, whereas the uppermost position corresponds to the position which the rod 50 occupies when it has been lifted by the crank device 56.

The bottom end of the rod 51 extends through the bottom cover 55 and is provided with a piston 57 which is vertically reciprocable in a cylinder 58, at the end of which connections 59 and 60 are provided for lifting and lowering the rod 51 by supplying air to and venting, respectively, the cylinder 58 via the connections 59 and 60. At the bottom of the cylinder 58 a support 61 is arranged, the elevational position of which may be varied by rotation by a bevel gear 62 in such a manner that the stroke length of the rod 51 may be varied. Along the external side of the column 41, vertical lifting rods 65 are movably arranged. The number of lifting rods 65 corresponds to the number of lifting arms 9. The lifting arms are secured to the lifting rods 65 at the inner ends of the arms. At the top end, each lifting rod 65 is provided with a T-shaped head 66 and, accordingly, the heads 66 may be moved into and through the downwardly open grooves in the catchers 52 and 53. Each lifting rod 65 has a roller 67 at the bottom end. The lifting rod 65 shown to the left in FIG. 3 is shown in a position which corresponds to the lower position of the corresponding lifting arm 9 shown in FIG. 3. The upper position (FIG. 3) of the lifting arm 9 corresponds to the upper position of the rod 50 (not shown in FIG. 3), and when the lifting rod 65 has been lifted corresponding to this position, the roller 67 at the lower end of the lifting rod 65 will be positioned immediately above an annular cam 70 which is stationary with respect to the rotating column 41. In the cam 70 recesses are provided below the catchers 52 and 53 for the passage of the lifting rods 65 when the latter occupy the corresponding positions, viz. corresponding to the positions 23, 27 and 10 in FIG. 1, and the position above the container 15, previously referred to. In all other positions than those referred to, the lifting rods 65 and, accordingly, also the lifting arms 9 are positioned at their upper position because the lifting rods 65, by means of their rollers 67, roll on the top side of the cam 70 as shown as regards the lifting rod 65 shown to the right in FIG. 3.

Further to the tongs 25, each lifting arm 9 carries a claw 72 at each end. Each claw is pivotable about a pivot 73 and is by means of a spring, not shown, biased towards the position shown in FIG. 3. However, each claw may be pivoted outwardly, i.e. away from the tongs 25 arranged between the claws. Each claw 72 carries a support pin 74 at the bottom end which are used for picking-up a row of moulds by gripping the corresponding support rods 18 and 19.

To this end, a hook 75 is secured to the top surface of each support rod 18 and 19 adjacent the ends of the rods. The shape of the hooks 75 appears clearly from FIG. 8 and FIG. 9 from which it will be seen that each hook has a curved upper surface and faces its opening outwardly, i.e. away from the corresponding moulds 17.

Accordingly, it will be understood that when a lifting arm 9 from which moulds and ice lollies have been removed, arrives at the position 23 in the lifted position, the head 66 of the corresponding lifting rod 65 will be caught by the catcher 52 from which the lifting rod 65 of the preceding lifting arm 9 has just been removed rolling upon the cam 70. The lifting rod 65 now caught and the corresponding lifting arm 9 are now lowered by means of the crank device 56 to the lower position shown in FIG. 3. Accordingly, the lower ends of the tongs 25 and of the claws 72 lowered toward the top surface of the freezing table 2 which is indicated in FIG. 3. During this movement, the support pins 74 will abut against the curved top surfaces of the hooks 75 and the claws will be caused to pivot outwardly, whereafter the support pins 74 will snap back into the hooks 75, whereby also the support rods 18, 19 will be caught. Simultaneously, the tongs 25 will in a manner known per se grip the sticks frozen into the ice lollies.

Immediately before a row of moulds 40 reaches the lifting position 23, the moulds have been thawed out loose with respect to the freezing pockets 22 by moderately heating the freezing pockets with the use of a thawing medium sprayed upon the pockets by an apparatus 36 shown in FIG. 2. The lifting arm 9 in question is now lifted to the upper position, shown to the left in FIG. 3, by crank device 56.

Due to the rotation of the column 41, the row of moulds 40 lifted in the manner described, will now be moved with the corresponding lifting rod 65 rolling upon the cam 70. When the row of moulds concerned reaches the position 27 in FIG. 1, the head 66 of the corresponding lifting rod 65 will be caught by the catcher 53 and will now be positioned above the apparatus 37 for removing the moulds from the ice lollies, as shown in FIGS. 4 and 5.

The apparatus 37 comprises a frame 77 supporting a conveyor belt 78 extending about two end rollers 79 and 80, of which the latter is driven by a motor 81. The frame supports two sets of longitudinally extending guide rails 82 and 83, respectively, as clearly shown in FIG. 5. Moreover, the frame 77 supports the nozzle arrangement previously referred to, viz. in the form of two tubes 30, 31 supplied from a supply tube 84 with washing medium.

Figure 4:
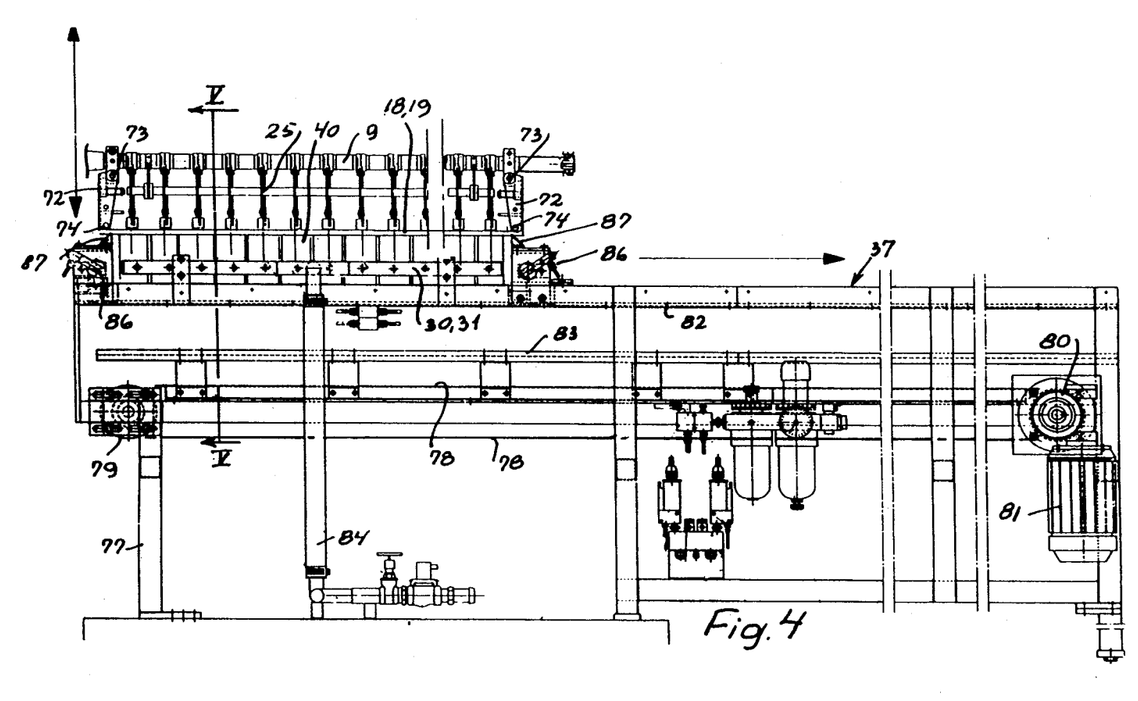
FIG. 4 is a schematic side view of an apparatus for the plant shown in FIG. 1 for removing moulds from picking-up ice lollies.

Moreover, the apparatus shown in FIG. 4 comprises devices 86, 86 for removing the moulds from the ice lollies. The devices 86, 86 are arranged with a mutual distance generally corresponding to the distance between the end claws 72 of a lifting arm 9. At the top each of the devices 86 has two triangular wedges 87 having sloping edges facing away from each other. The sloping edges are arranged immediately below the support pins 74 of the claws 72 when a lifting arm occupies the position shown in FIG. 4. The lifting arm is shown in a partly lowered position in FIG. 4. As the downward movement continues, the support pins 74 will abut the sloping edges whereby the support pins 74 will be released from the hooks 75 previously referred to and arranged at the ends of the upper surfaces of the support rods 18, 19. Immediately before and during this downward movement, the outer surfaces of the moulds 17 will be sprayed with thawing medium from the nozzle arrangement 30, 31 in such a way that the mould halves 20, 21 will be thawed loose with respect to the ice lollies positioned upon sliding blocks 89 mounted in the devices 86, FIG. 5. The ends of each set of support rods 18, 19 are at the inner surfaces of the support rods provided with a recess as indicated at 90 in FIGS. 8 and 9. Each separating device 86 comprises two pistons devices 91, 91, the piston 92, 92 of which in their extended positions are arranged with their ends closely adjacent each other. The end of each piston 92 is shaped as a hook and as the support rods 18, 19 are being positioned upon the blocks 89, 89, these hooks will engage with the end recesses 90 in the support rods. After such engagement has been established, all the cylinder devices 91, viz. the two cylinder devices 91 in each of the separating devices 86, are activated and thereby the support rods 18, 19 are drawn away from each other and, simultaneously, the ends of the support rods 18, 19 will slide upon the top surfaces of the sliding blocks 89, 89. When the ends of the support rods 18, 19 leave the sliding blocks 89, the two rows of mould halves will fall slightly downwardly and will occupy the positions shown in FIG. 5, wherein the mould halves with their lower ends rest upon the conveyor belt 78 and along their outer surfaces are guided by means of the sets of rails 82,82;83,83. Now the ice lollies suspended in the tongs 25 have been released and the arm 9 may be moved upwardly to the lifted position for being moved further on to the position above the container 15, FIG. 1, at which the lifting rod 65 of the lifting arm in question will be caught by the other catcher of the rod 51 for being dipped into the container. After such dipping, the ice lollies continue until the lifting arm occupies the position 10 in FIG. 1, at which the corresponding lifting rod 65 will be caught by means of the other catcher of the rod 50 for being deposited into the packing machine 11.

Figure 5:
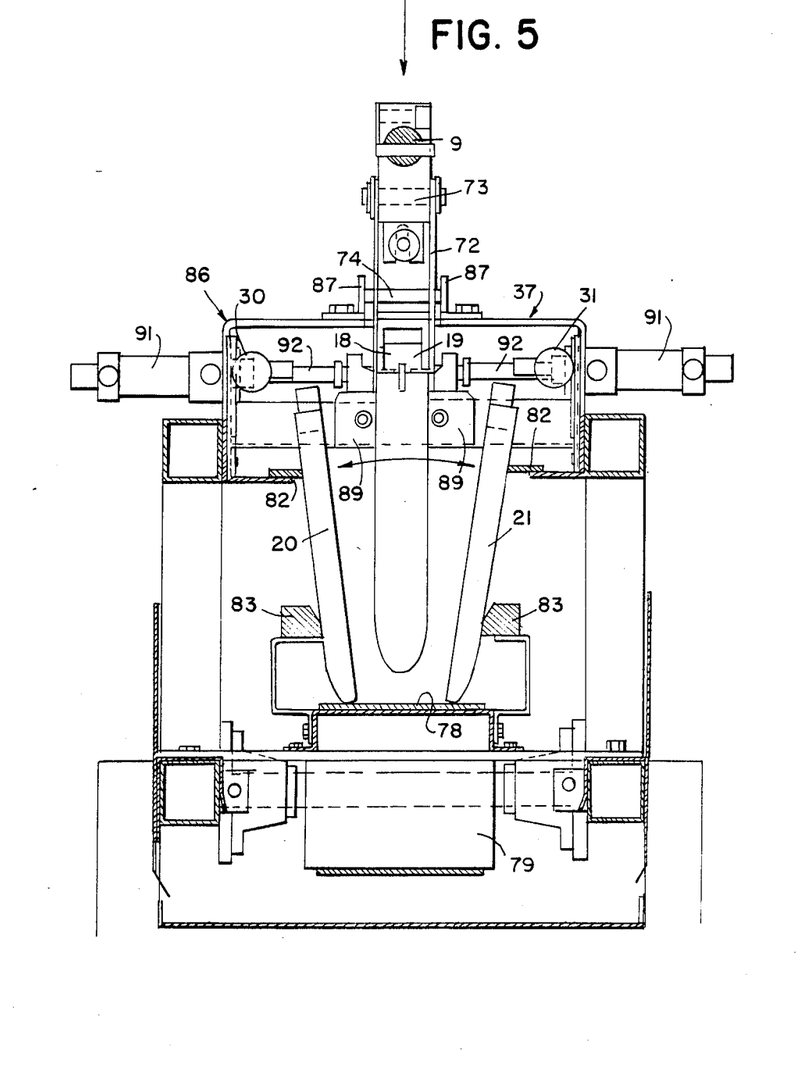
FIG. 5 is a section taken along line V—V of FIG. 4.

The conveyor belt 78 is driven continuously by the motor 81 and, accordingly, the rows of mould halves will be moved in a direction towards the right hand end of the apparatus in FIG. 4 generally standing in the position shown in FIG. 5. Now the rows of mould halves are gripped manually and are arranged upon the entrance end of the apparatus 38 shown in FIG. 4 for transportation of the moulds back to the freezing table 1 and for insertion of the moulds into the latter.

Figure 6:
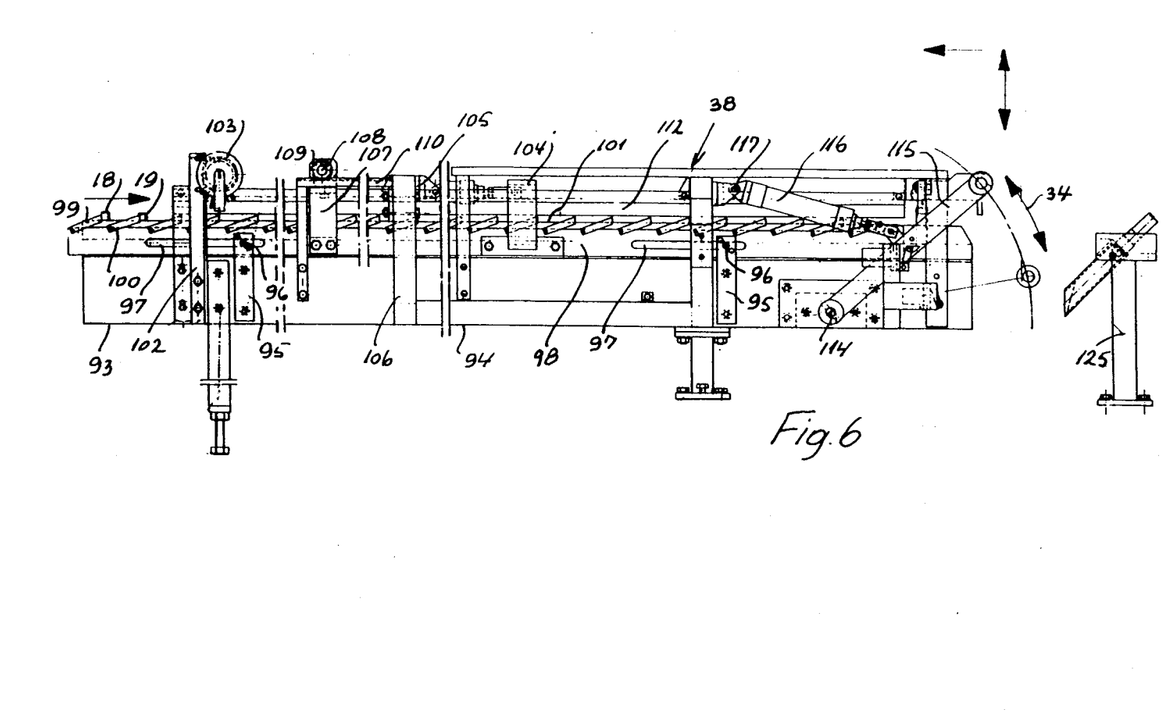
FIG. 6 is a schematic side view of an apparatus for the plant illustrated in FIG. 1 for transportation of moulds and insertion of moulds into the ice lolly freezing machine.

As shown in FIG. 6 the apparatus 38 comprises a frame 93 with two mutually parallel side plates 94 of which only the one facing the viewer is visible in FIG. 6. To the outer surface of each side plate two brackets 95, 95 are secured which each at the top carries an inwardly extending guiding pin 96, 96. Each guiding pin 96 of a side plate 94 engages a longitudinally extending slot 97, 97 in a pushing rail 98. Two such pushing rails extend generally along the full length of the apparatus shown, and each pushing rail carries pushing dogs 99 at the top edge. The pushing dogs each have a U-shaped cross section and their branches extend downwardly along each side of the upper edge of the corresponding pushing rail 98. The pushing dogs are pivotally connected with the pushing rails by pivots 100. Each pushing dog is provided with a comparatively weak spring (not shown) which biases the corresponding pushing dog 99 towards the lifted position as shown in FIG. 6.

Immediately inwardly with respect to each pushing rail 98, a support rail 101 is arranged, the upper edge of which is visible in FIG. 6. This upper edge extends slightly above the upper edge of the corresponding pushing rail 98. The supporting rails 101 are stationary and are arranged with a mutual distance which is slightly shorter than the length of the support rods 18, 19, but greater than the distance between the outer sides of the two outermost mould halves carried by such support rod 18, 19. Accordingly, it will be understood that a support rod with mould halves connected thereto may be arranged in such a manner that the ends of the support rod rest upon the upper edges of the two support rails 101 and in such a manner that the ends extending outwardly with respect to the support rails 101 may cooperate with the pushing dogs 99.

The distance between two pushing dogs 99 following each other is just sufficient for inserting, between two such pushing dogs, a row of mould halves and in such a way that the corresponding support rod 18, 19 rests upon the upper edges of the support rails 101. Two such support rods 18, 19 are shown at the left hand end of FIG. 6, but without the corresponding mould halves.

A further bracket 102 is secured to each of the side plates 94 and the bracket 102 supports a washing apparatus 103 which extends crosswise above the apparatus for washing the suspended rows of moulds. To the outer surface of each pushing rail 98, a bracket 104 is secured and the top ends of the brackets 104 are mutually connected by means of a bridge to the centre of which one end of a cylinder device 105 is secured, the other end of which is supported by a corresponding structure comprising two brackets 106 each secured to the outer surface of each of the side plates 94 and the upper ends of which are connected by means of a bridge. Accordingly, it will be understood that by expanding and contracting the cylinder device 105, the pushing rails 98 will be subjected to a reciprocating movement controlled by the engagement between the pins 96 and the slots 97. In order to synchronize the movements of the two pushing rails 98, a bracket 107 is secured in each pushing rail and the upper ends of these brackets 107 serve to support a shaft 108 to each end of which a gear 109 is secured. Each of the gears 109 engages with a tooth rack 110, and one such rack 110 is connected to each of the side plates 94.

Above each pushing rail 98 a strip 112 of brushes is secured in such a manner that the lower edges of the brush strips have a small distance from the free ends of the pushing dogs 99.

At the right hand end of each side plate 94, an insertion arm 115 is pivotally connected by a pivot 114. Each insertion arm 115 is connected with one end of a cylinder device 116, the other end of which is carried by a pivot 117, which is secured to the frame of the apparatus.

Figure 8:
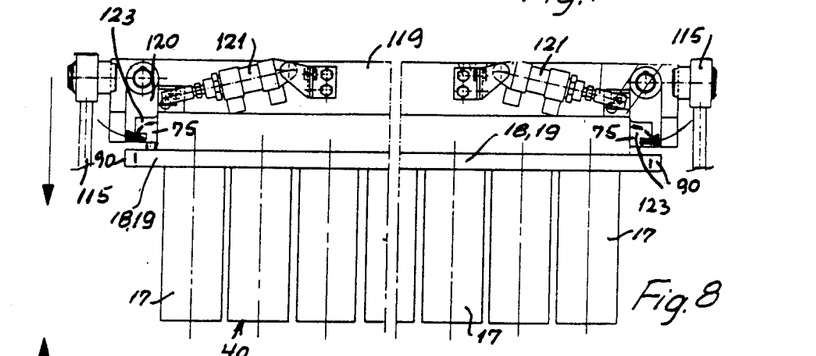
FIG. 8 is a section taken along the line VIII—VIII of FIG. 7, with a row of moulds in lifted position.
Figure 9:
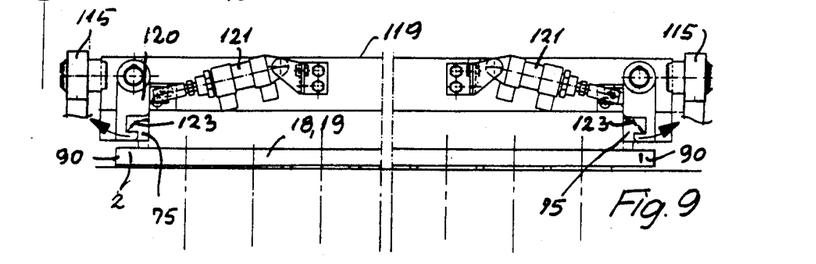
FIG. 9 is a section corresponding to FIG. 8, wherein however the moulds have been inserted into freezing pockets.

As shown in FIG. 8 a bridge 119 is pivotably connected with the outer end of each of the insertion arms 115. At each end the bridge carries a pivotable suspended claw 120, which are arranged with a mutual distance generally corresponding to the mutual distance between the hooks 75 previously referred to and arranged upon the upper surface of each support rod 18, 19. Each claw 120 is connected with a cylinder device 121, by means of which the two claws 120 may be pivoted outwardly as indicated by arrows in FIG. 9 and inwardly as indicated in FIG. 8, viz. from and to a position wherein the claws engage the hooks 75.

The apparatus shown in FIGS. 6–9 operates in the following manner:

The pushing rails 98 and accordingly also the pushing dogs 99 are reciprocated by cylinder device 105. During the forward movement, the pushing dogs push the support rods 18, 19 forward and during the return movement of the pushing rails 98, the support rods 18 and 19 are maintained in their positions by the brush strips 112. During the return movement of the pushing rails 98 the pushing dogs 99 are moved downwardly in such a way that they, generally, will extend flush with the upper edges of the support rails 101. In this way the support rods 18, 19 and the mould halves carried thereby are moved to the right in FIG. 6 during which movement the mould halves are washed by the washing device 103 which is arranged outside the circumference of the freezing table 2. The synshronizing device 108, 109 insures that the pushing rails 98 are moved in synchronism.

Figure 7:
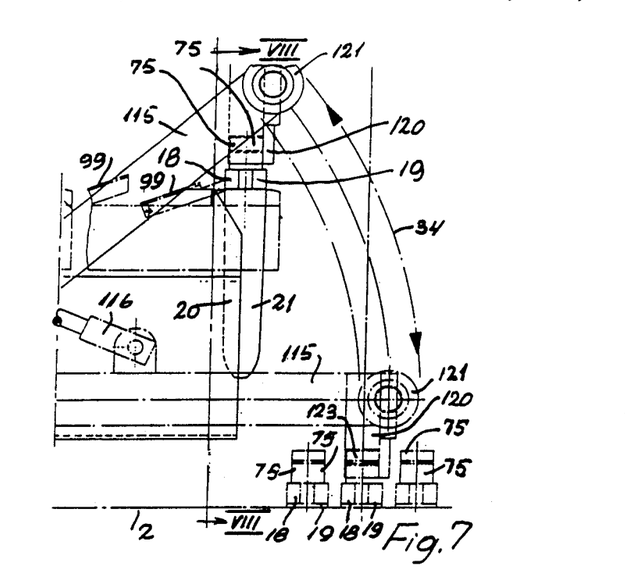
FIG. 7 shows the right hand end of the apparatus shown in FIG. 6 at an enlarged scale.

In each of the claws 120 and in the side of the claws facing to the left in FIG. 7, a recess 123 with closed bottom is arranged. When a support rod 19 arrives at the right hand end of the apparatus in FIG. 7, the hooks 75 of the support rod will be accomodated in the recesses 123 in the claws 120 which occupy the position shown in FIG. 8. The following support rod 18 will, by means of the last set of pushing dogs 99, be pushed into abutment with the support rod 19, the hooks of which have already been inserted into the recesses 123, and also the hooks 75 of the support rod 18 will be pushed into the recesses. Simultaneously, the hooks 75 on the support rod 19, already arrived, will be pushed against the bottoms of the recesses. The two rows of mould halves 20, 21 supported by the rods 18 and 19 will now be in the closed position as shown in FIG. 7, and by pivoting the insertion arms 115 by means of the cylinder devices 116, the closed row of moulds will be inserted into the row of freezing pockets 22 occupying the position 23, cf. FIG. 2. Accordingly, it will be understood that the arrow 34 in FIG. 2 illustrates the swing movement of the insertion arms 115. Moreover, it will be understood that this insertion of a row of moulds is carried out after the row of freezing pockets has been emptied. In order to prevent exaggerated swing of the moulds, an end stop 125 is arranged as shown in FIG. 6.

In the embodiment shown in the drawing, thawing the moulds 27 loose from the freezing pockets 22 is carried out by spraying devices 36, one of which as mentioned is shown in FIG. 2 at the position 23. However, it will be understood that corresponding spraying devices are also present at the preceding positions of the freezing pockets. Since thawing takes place in two stages, i.e. first thawing loose the moulds from the freezing pockets and then thawing the moulds loose from the ice lollies outside the freezing table 2, the heat supplied to the freezing pockets 2 can be reduced considerably as compared with the case where both thawing the moulds loose from the freezing pockets and thawing the ice lollies loose from the moulds are done while the moulds are positioned in the freezing table 2, and consequently the temperature of the freezing pockets 22 can rapidly be reduced to the level desired for freezing after the moulds have been removed.

Since thawing the moulds loose from the ice lollies also takes place after the row of moulds concerned have been moved outside the freezing table 2, there is a minimum of risk of the freezing pockets being polluted by drops from the moulds, or by material remnants from these dropping into the freezing pockets. Besides, effective thawing loose of the ice lollies from the moulds can be carried out while these are positioned outside the freezing table 2 at position 27 so that the ice lollies can be taken out without breaking and without material remnants being left in the moulds which otherwise would prevent the closing and insertion of the moulds into the freezing pockets. This last mentioned condition is further improved by the fact that it is also possible to wash the moulds inside and outside while they are outside the freezing table, viz. by means of the washing device 103 positioned at the entrance end of the apparatus 38.

The method and the picking-up device have been described above according to the invention in connection with a rotary freezing machine. However, it will be understood that the invention also includes ice lolly freezing machines of the kind in which the freezing pockets are moved row by row parallel with each other. Furthermore, the method and the picking-up device according to the invention have been described in connection with a rotary lifting device with radial arms. However, it will be understood that the invention also comprises lifting apparatuses wherein lifting arms are moved parallel with each other. The invention can thus also be realized by a combination of a rotary freezing machine and a lifting apparatus having lifting rods moved parallel to each other as well as a combination of a freezing machine with rows of freezing pockets moved parallel with each other and a lifting apparatus with lifting rods moved parallel with each other. In all these plants there is nothing to prevent a station for thawing the moulds loose from the ice lollies being placed outside the freezing pocket area and, if desired, also a mould washing station.

I claim:

1. A method for picking-up ice lollies from rows of freezing pockets (22) in an ice lolly freezing machine in which the ice lollies are frozen in two-parted moulds (20,21) by which method the moulds (17) are thawed loose from a row of freezing pockets (22) in which freezing has taken place, are lifted up from the freezing pockets (22) and separated for release of the frozen ice lollies, assembled and inserted in a row of freezing pockets (22), comprising the steps of moderately heating the rows of freezing pockets (22) before lifting the moulds, the heating being carried out sufficiently for thawing the moulds (17) loose from the freezing pockets (22), lifting the moulds (17), moving the molds to a position (27) outside an area of the freezing pockets of the freezing machine, the moulds (17) being heated (at 30, 31) after having been moved outside said area, separating the moulds and removing the ice lollies from the moulds while the moulds (17) are outside said area, moving the moulds (17) back to said area, and inserting the moulds (17) in an empty row of freezing pockets (22).

2. The method according to claim 1, comprising the further step of washing the molds (17) while they are positioned removed from the area of the freezing pockets (22).

3. The method according to claim 1, wherein the machine is of the rotary type and the freezing pockets (22) are positioned in radial rows and a rotary lifting apparatus (8) is used having radially directed upwardly and downwardly movable arms (9), comprising the further steps of moving the molds (17) with the ice lollies arranged therein to a position corresponding to a ¼ revolution of the lifting apparatus, the separating and removing steps being carried out in said position, and thereafter moving the moulds (17) radially relative to the axis of the lifting apparatus (8), the moulds thereby being swung a 1/4 revolution and being moved back to said position at which they were lifted.

4. Picking-up device for picking-up ice lollies from rows of freezing pockets (22) in an ice lolly freezing machine (1) in which the ice lollies are frozen in two-parted moulds (17) insertable in said rows, means (36) for supplying thawing medium to the outer surfaces of the freezing pockets (22), means (9) for lifting the moulds (17) from the freezing pockets (22), means for separating the moulds (17), means (25) for removing the frozen ice lollies and means for inserting the moulds (17) into the freezing pockets (22), the picking-up device comprising means (9, 18, 19, 25) for moving the lifted moulds (17) in closed condition to a position (23) outside an area of the freezing pockets, outside said area means (30, 31) being arranged for supplying thawing medium to the outer surfaces of the moulds, and said picking-up device further comprising means for moving the moulds (17) back to said area and inserting the closed moulds into a row of freezing pockets.

5. Picking-up device according to claim 4, wherein the ice lolly freezing machine includes a rotary freezing table (2), the freezing pockets (22) being arranged in radial rows in said table (2), and wherein the means for lifting the moulds up from the freezing pockets are constituted by a rotary lifting apparatus having radially directed upwardly and downwardly movable arms (9), the lifting apparatus having a working position (27) for supplying thawing medium to the outer surfaces of the moulds, said working position (27) being offset approximately 90 degrees in the direction of rotation of the lifting apparatus from the lifting position (27) of the lifting apparatus.

* * * * *